Dec. 18, 1951 W. J. FAULKNER 2,578,792

RECORD CHANGER

Filed Sept. 10, 1943 6 Sheets-Sheet 1

INVENTOR.
WILLARD J. FAULKNER
BY
Richey & Watts
ATTORNEYS

INVENTOR.
WILLARD J. FAULKNER
BY Richey & Watts
ATTORNEYS

Dec. 18, 1951 W. J. FAULKNER 2,578,792

RECORD CHANGER

Filed Sept. 10, 1943 6 Sheets-Sheet 3

INVENTOR.
WILLARD J. FAULKNER
BY Richey & Watts
ATTORNEYS

INVENTOR.
WILLARD J. FAULKNER
BY
Richey & Watts
ATTORNEYS

INVENTOR.
WILLARD J. FAULKNER
BY Richey & Watts
ATTORNEYS

Dec. 18, 1951 W. J. FAULKNER 2,578,792

RECORD CHANGER

Filed Sept. 10, 1943 6 Sheets-Sheet 6

INVENTOR.
WILLARD J. FAULKNER
BY
Richey & Watts
ATTORNEYS

Patented Dec. 18, 1951 2,578,792

UNITED STATES PATENT OFFICE 2,578,792

RECORD CHANGER

Willard J. Faulkner, Chicago, Ill., assignor, by mesne assignments, to Admiral Corporation, Chicago, Ill., a corporation of Delaware Application September 10, 1943, Serial No. 501,742

15 Claims. (Cl. 274—10)

This invention relates to improvements in automatic record changers and more particularly to a type of record changer wherein a stack of records is supported above the turntable and released singly onto the turntable. In the past a considerable number of record players, sometimes called changers, have been provided wherein the records are supported in a stack above the turntable and dropped singly, one by one, onto the turntable and on top of each other to effect the playing of one side. These record changers have comprised mainly two structures, one where the records are supported entirely by platforms at the side and merely guided by a spindle onto the turntable and the other where the records are supported by the spindle itself, which is stationary, and a platform at the side. These later record changers are found subdivided into two classes, one where the release of the record is effected by a mechanism within the spindle itself and the other where the changing is effected by shoving the record off of a shoulder on the spindle by the record side support. This latter type of record player is shown in my co-pending application, Serial No. 393,984, filed May 17, 1941, Patent No. 2,331,383, dated October 12, 1943.

These prior devices entailed various degrees of complication. A relatively complicated linkage had to be used to change the mechanism for supporting 10- or 12-inch records.

The record changing operation effected by some of these other devices has a disadvantage in that the gears rumbled and clattered when the changing was being effected. One of the disadvantages of the prior art device was due to the fact that in time the various linkages become worn necessitating frequent adjustment and causing a number of service calls since the adjustments were not usually capable of being effected by the users.

Still other disadvantages resided in the fact that the previous record changers had to be built in conjunction with a table or supporting frame which could not readily be installed in some existing cabinets.

By the present invention I have made a record changer where the complicated linkages of the prior art are eliminated. The actual mechanism and its supporting frame can be installed in substantially any cabinet by merely sawing a simple shaped hole in the support with a coping saw. By eliminating the metal frame or panel a considerable reduction in the use of metal is effected which has several advantages among which are first, that metal is an essential war material and hard to get, second, the metal does not always esthetically combine with the existing cabinet to present a neat appearance, and third, the excessive metal has a tendency to shield the loop usually provided with modern receivers and thus impede the reception of radio signals.

It is therefore an object of my invention to provide an improved automatic record player.

Another object of my invention is to provide a record player that is extremely simple in operation and contains no complicated adjustments.

Another object of my invention is to provide a simplified record changer where the utilization of metal is cut to a minimum.

Another object of my invention is to provide an improved automatic record player which may be quickly and easily adjusted by the inexperienced to play either 10-inch or 12-inch records.

Another object of my invention is to provide a record player having noiseless record changing mechanism.

Another object of my invention is to provide a record player which will change the records quickly minimizing the time between record playing sequences.

Other objects of my invention and the invention itself will become more apparent from the following description of an embodiment thereof which description is illustrated by the accompanying drawings and forms a part of this specification.

Figure 13:
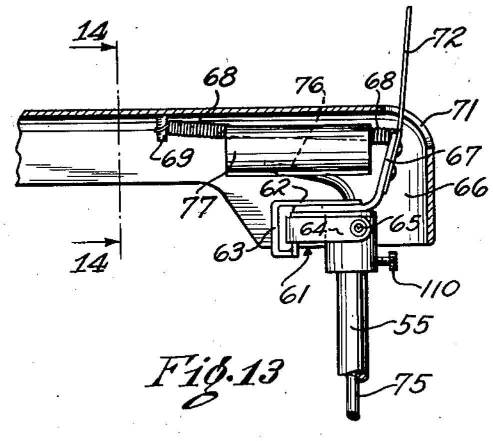
Figure 14:
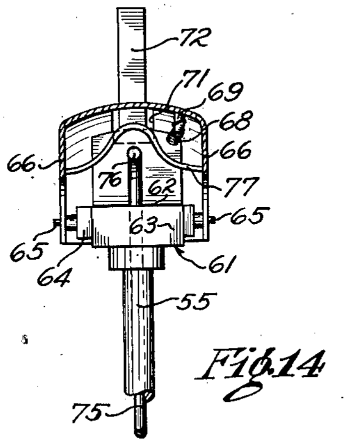
Figure 15:
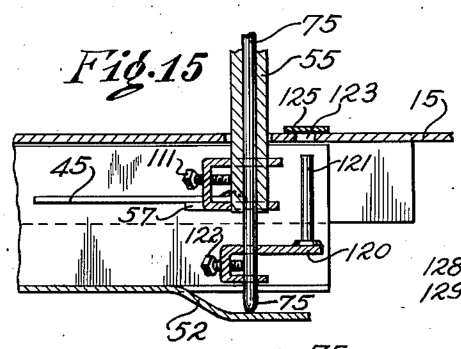
Figure 16:
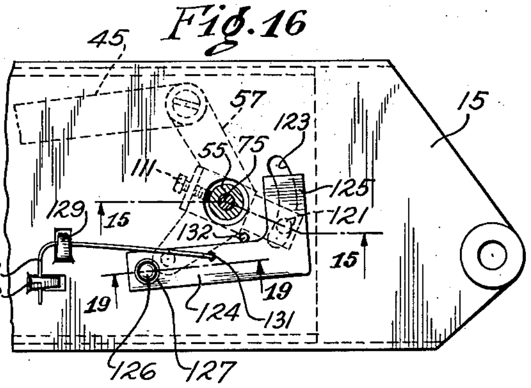
Figure 17:
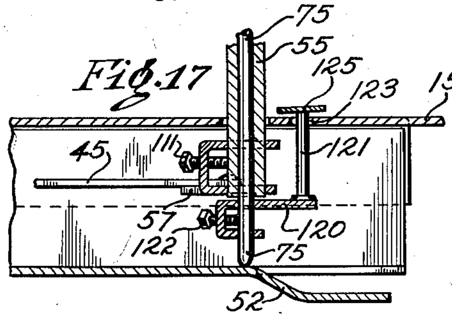
Figure 18:
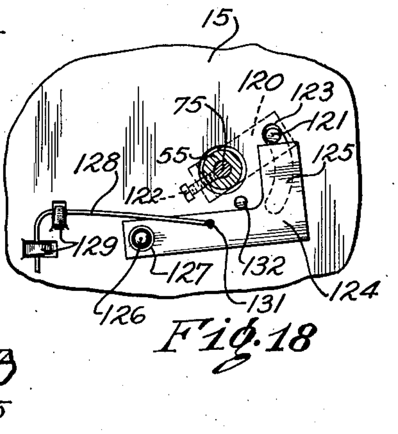
Figure 19:
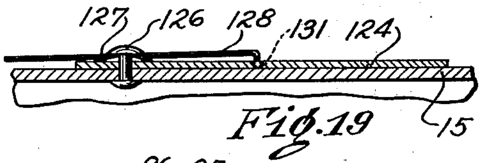
Figures 20, 21:
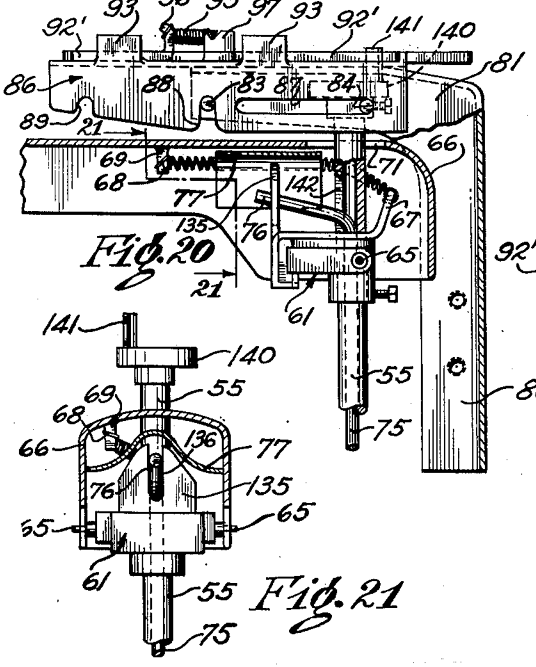

11 showing the same with the platform in a lowered position;

Fig. 13 is a fragmentary section taken through the center of the tone arm and showing the tone arm support in elevation;

Fig. 14 is a similar section taken from a plane indicated by the line 14—14 of Fig. 13;

Fig. 15 is a fragmentary section taken through the frame and slide member and showing a modification of the invention, the view being taken on the line 15—15 of Fig. 16;

Fig. 16 is a fragmentary plan view, with certain parts shown in section, of the modification of Fig. 15;

Fig. 17 is a view similar to Fig. 15 showing the parts during a different period of the cycle of operation;

Fig. 18 is a view similar to Fig. 16 showing the parts during a different period of operation;

Fig. 19 is an enlarged section taken on the line 19—19 of Fig. 16;

Fig. 20 is a view partly in section and partly in elevation of the record ejector and support as well as the tone arm support illustrating a modified form of the invention;

Fig. 21 is a section taken on the line 21—21 of Fig. 20; and

Figure 22:
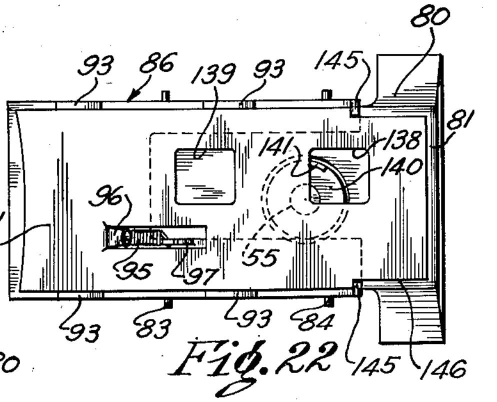

Fig. 22 is a plan view of the modified form of record support and ejector of Fig. 20.

Figure 1:
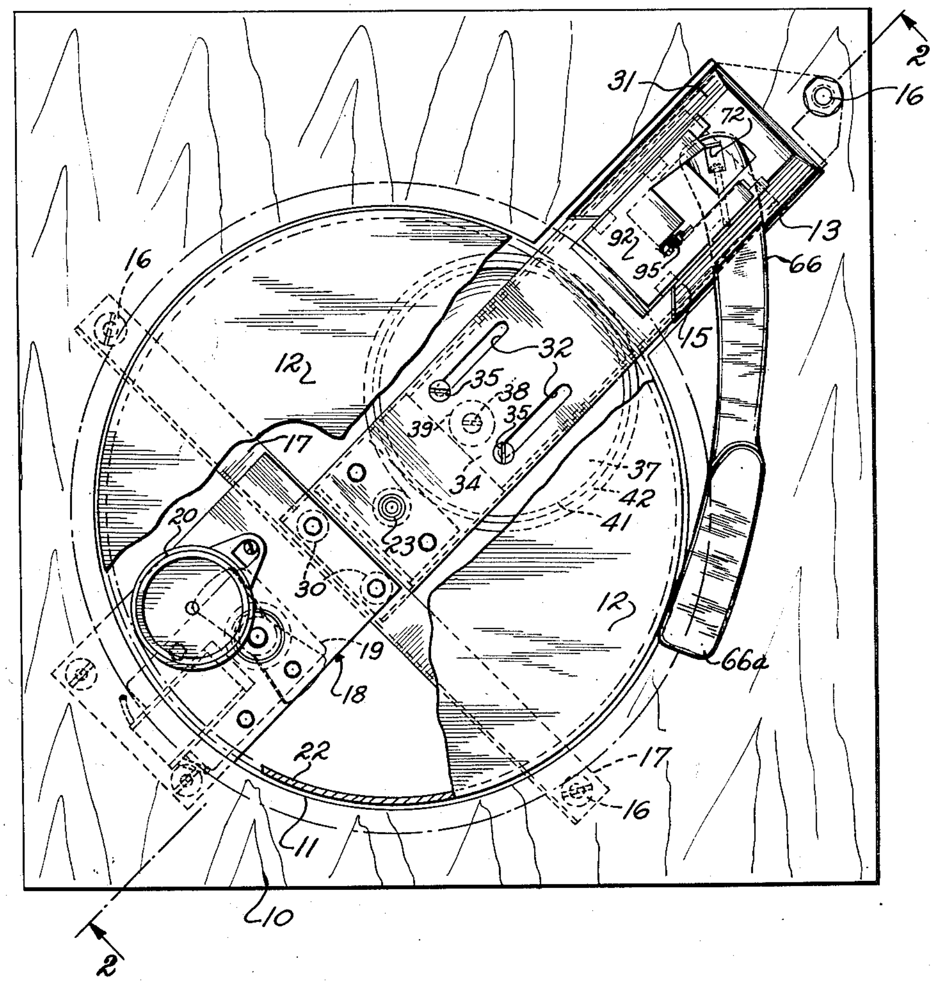
Fig. 1 is a plan view of the record player of my invention with certain parts broken away to show the structure underneath and illustrating the same as secured to the wooden panel.
Figure 2:
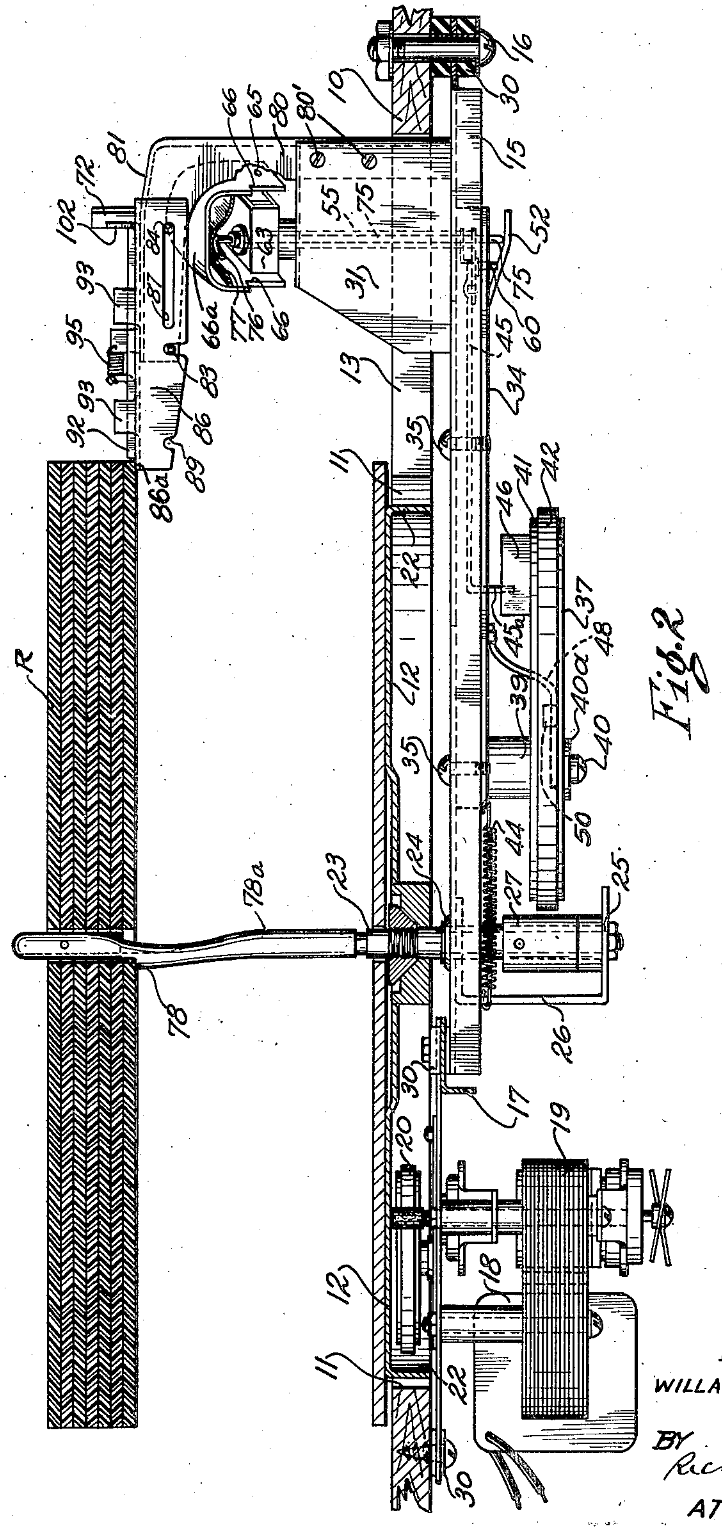
Fig. 2 is an enlarged vertical section taken on the line 2—2 of Fig. 1.

Referring now to the drawings throughout which like parts have been designated by like reference characters;

The apparatus as best illustrated in Figs. 1 and 2 is adapted for mounting on a wood composition panel or base 10 which is provided with a circular opening 11 through which the turntable 12 may extend and revolve. Extending from the opening 11 towards one corner of the panel 10 is a wide slot 13 through which the changing mechanism may extend upwardly. The mechanism is all supported from below the panel 10 and includes a main frame member 15 having one end secured to the panel by screws or bolts 16 and the other end secured to a cross member 17, the cross member in turn being secured to the underside of the panel by screws 16. Also secured to the cross member is the motor drive unit 18 which includes a motor 19 that drives a friction wheel 20, the friction wheel being disposed in engagement with the inner side of the flange or rim 22 that depends from the turntable 12 providing what is known as a rim drive.

The turntable 12 is carried on a rotatable hollow spindle 23, the spindle being journalled in an upper bearing 24 carried by the main frame 15 and a lower bearing 25 carried by a bracket 26 below the main frame and connected thereto. Intermediate the two bearings the spindle is provided with a drive ring or hub 27 which is adapted to drive the record ejecting or changing mechanism. Suitable grommets 30 of rubber or other shock absorbing material are provided in the main frame member to insulate the same against noises that might otherwise be communicated through the frame and spindle to the turntable.

Figure 4:
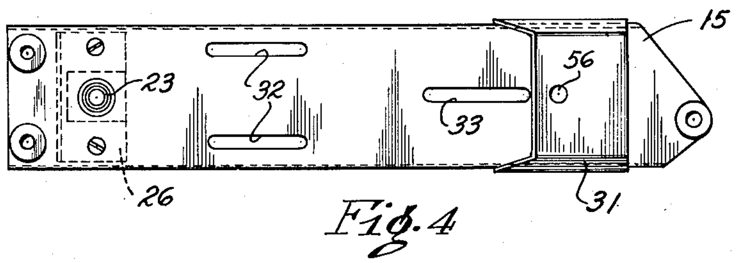
Fig. 4 is a plan view of the main frame member.
Figure 5:
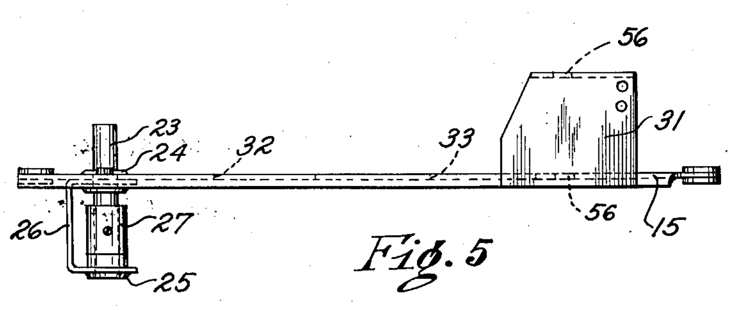
Fig. 5 is a side elevational view of the main frame member of Fig. 4.

The frame member assembly 15 is best shown in Figs. 4 and 5 and includes a channel-shaped frame member which extends over to one corner of the base panel being provided adjacent its end with an upwardly extending superstructure 31 which comprises a support for the record selecting or changing mechanism and the tone arm 66*a*.

The frame member is provided with three longitudinally extending slots intermediate the sides, two of them, 32, being in parallel relation and spaced from the spindle and the third one, 33, still further spaced from the spindle and extending near the superstructure 31.

The means for lifting the tone arm from the played record, moving it to one side clear of the record, ejecting the records, and returning the tone arm to the playing position is controlled by a slide, Figs. 6 and 7, hereinafter called the cam slide 34. This member is also of channel shape and slidably fits between the sides of the frame member 15 being held therebetween by shoulder screws 35 which extend through the slots 32 and 33 with the heads above and slidable on the top of the frame 15 and with the ends threaded into the slide 34 allowing the cam slide to slide in the frame member within the limits of the slots 32 and 33.

The means for sliding the slide in the frame member comprises a wheel 37 which is eccentrically secured to the slide and is driven by the hub 27. In this instant the wheel is provided with a hub 39, integral with the wheel, and the slide is provided with a pin 38 which is staked in the slide 34 and upon which the hub is journalled, the wheel being held on the pin by a screw 40 and washer 40*a*.

The wheel is provided with a peripheral flange 41 on which is disposed a friction ring 42 which may be of rubber or other friction material. One revolution of the wheel causes one cycle of movement of the slide to: first, effect raising of the tone arm from the record; second, the swinging of the tone arm to one side of the turntable out of the path of the record; third, ejection of a record from the unplayed stack so that it may fall on to the turntable; fourth, return of the tone arm to the playing position; and fifth, lowering of the tone arm into the record groove.

It will be seen that the eccentric wheel may revolve through two extreme positions, first, where the radius of the wheel from the pivot to the periphery at the point opposite the turntable spindle is the shortest radius, and the other, 180° opposite, where the longest radius of the wheel is adjacent the spindle. In the playing position the eccentric wheel is held with the shortest radius toward the spindle; in this position (Fig. 2) the friction ring is out of engagement with the hub on the turntable spindle since the slots 32 and 33 limit the movement of the slide and eccentric towards the spindle, the screws 35 engaging in the ends of the slots. The slide is normally pulled toward the turntable spindle by a spring 44, one end of which is hooked in the bracket 26 and the other end hooked to the slide 34.

Means is provided for holding the eccentric wheel in a position known as the record playing position where the drive surfaces between the spindle and the wheel are out of engagement and means is also provided so that when the first means is withdrawn a second means will give the wheel a push which will revolve it sufficiently, the wheel being eccentrically mounted, for the frictional driving surfaces to come into engagement with each other. The holding means comprises a trip 45*a* controlled by the tone arm which engages the side of a lug 46 that is struck from the mid portion of the wheel and extends upwardly therefrom toward the bottom of the slide (see Figs. 2, 6, and 7). The trip extends downward through a slot 47 in the slide and is on the end of a connecting member connected to the tone arm as hereinafter more fully described.

Figure 3:
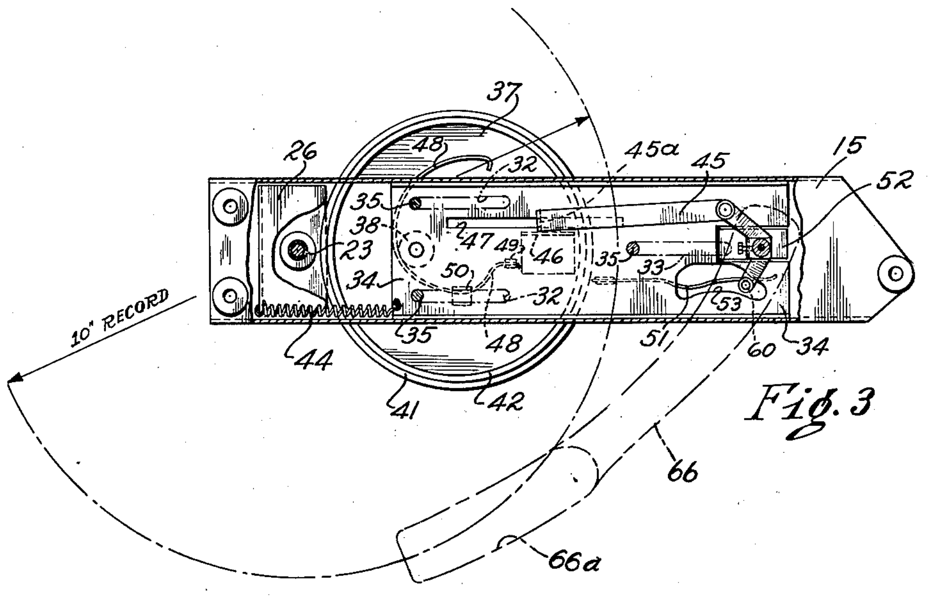
Fig. 3 is a view in horizontal section taken from below the turntable showing the record changing mechanism and in dot-dash lines the portion of the pickup arm.

The means for giving the wheel its initial push comprises a spring 48 of C-shape having one end anchored to the slide in the lugs 49 and the C-shape portion of which extends around the pivot for the eccentric, engaging an upwardly extending lug 50 struck from the body of the wheel. The spring is so positioned and formed that it exerts its greatest force against the lug when the eccentric wheel is in the playing position (Fig. 3) and when the trip 45a is moved out of engagement with the lug 46 the spring moves the wheel. Although the spring 48 is shown as being in contact with the hub 39 of the eccentric wheel, it will be clear that since the spring is secured to the wheel at 49, and the lug 50 is closer to that point, there will be greater pressure exerted on the lug 50. Also, as soon as the wheel is tripped, the spring moves away from the hub 39 as can best be seen in Fig. 6. As the wheel revolves the lug always comes back within the confines of the spring allowing it to automatically come back to its initial position where the wheel is held against movement by the trip 45a.

The slide is provided with a tone arm raising cam 52 disposed at the end opposite from the spindle, which is formed by striking a tongue from the slide and bending it to the proper formation. Adjacent the cam is formed the tone arm swinging slot 53 which is formed by removing the metal of the slide to provide an opening of the desired shape.

The means for supporting the tone arm comprises a sleeve 55 that is rotatably journalled in aligned openings 56 in the main frame 15 and in the top of the superstructure 31. The bottom of the sleeve has secured thereto a lever 57 one end of which extends from one side of the sleeve and has pivotally connected thereto at 58 the end of the trip lever 45. The trip lever extends from the lever 57 towards the spindle and there it is provided with a downwardly extending portion which carries the trip 45a adapted for engagement with the lug 46 on the eccentric wheel. The sides of the lug 45a are provided with kerfs 59 the bottoms of which engage with the sides of the slot 47 in the slide and guide the same.

Figures 8, 9, 10:
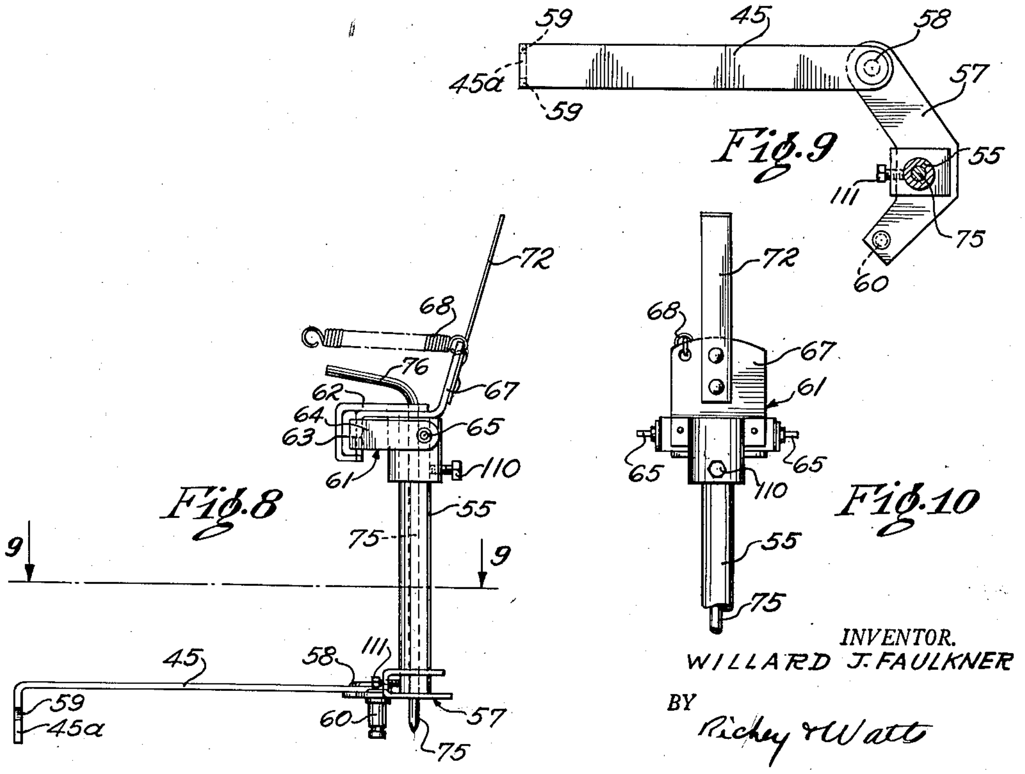
Fig. 8 is an enlarged view of the pickup arm support and linkage removed from the assembly.
Fig. 9 is a sectional plan view taken from a plane indicated at 9—9 of Fig. 8.
Fig. 10 is a rear elevational view of the tone arm supporting portion of the apparatus illustrated in Fig. 8.

The other end of the lever 57 extends angularly from the sleeve and carries a downwardly extending pin 60. This pin extends through the slot 53 and is adapted to be engaged by the edges thereof to effect the proper movement of the tone arm. The upper end of the sleeve 55 has secured thereto and rotatably resting on top of the superstructure a tone arm support 61. The tone arm support (Figs. 8 and 10) includes a base 62 that is carried on the member 61a and extends toward the turntable spindle. This base is provided with a downwardly extending flange 63 from which a pair of flexible arms 64 extend rearwardly and are provided at their extremity with pins 65 extending laterally from the arms and slightly to the rear of the pivot of the axis of the sleeve adapted for engagement with the sides 66 of the tone arm (Figs. 13 and 14). The base 62 and its downwardly extending part 63 as well as the upwardly extending lug 67 may all be formed of one strip of metal which is bent to the form best shown in Fig. 8. At the rear of the platform is an upwardly extending flange 67 to which a spring 68 is secured that engages with a pin 69 on the under side of the tone arm; the spring acts as a counterbalance for reducing the pressure of the needle in the tone arm on the records.

Riveted to the flange 67 and extending upwardly therefrom and through an opening 71 in the tone arm is an ejector operating member 72. The opening 71 in the tone arm is sufficiently large that the tone arm may pivot freely about its pivot 65 without interference with the ejector member. The ejector member may rotate with the tone arm but is unaffected by raising and lowering movement thereof because it is carried by the tone arm support rather than the tone arm. Extending through the center of the sleeve 55 is a tone arm raising pin 75. The pin extends downwardly through the lever 57 and is adapted for engagement with the cam 52 at its lower end, the upper end being bent at 76 and extending forwardly toward the turntable spindle adapted for engagement with a seat member 77 disposed between the sides of the tone arm.

The records are supported in a stack above the turntable by a stationary spindle 78a which extends through the turntable spindle 23, and is provided with a shoulder 78 for engaging the records at their center holes in a manner described in my above mentioned co-pending application, and by a platform for supporting the edges of the records at one side of the turntable above the tone arm. The platform includes a channel-shaped member 80 secured to the superstructure 31 by screws 80′ extending upwardly in the rear of the tone arm and then forwardly at 81 overhanging the tone arm. The ejector member 72 on the sleeve extends upwardly through an opening 82 in the overhanging portion. The overhanging portion is provided with a pair of laterally extending pins 83 at the forward extremity and a second pair 84 at the rear, the pins extending laterally from the sides of the overhanging portion which is channel-shaped throughout.

Figure 11:
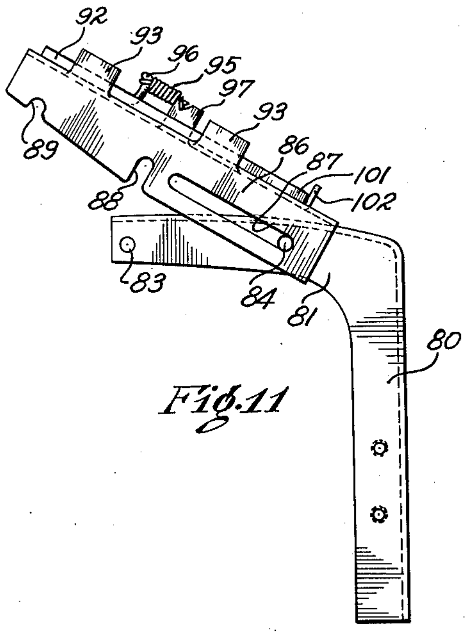
Fig. 11 is an enlarged side elevational view of the record supporting platform removed from the assembly and showing the platform in a raised position where it may be moved and reseated for the playing of 10- or 12-inch records.

A record support and ejector is carried by the overhanging portion and comprises a channel-shaped record supporting member 86, the sides of which embrace the sides of the overhanging portion and which are provided with longitudinally extending slots 87 through which the pins 84 extend. Forward of the slots 87 the sides are provided with pairs of notches on opposite sides, 88 being the notches closest to the slot and 89 being the notches farthest from the slot and in the forward extremity of the record platform. These notches are adapted for locking engagement with the pins 83 on each side. That is, the platform may be raised, pivoting about the pins 84, and slid (Fig. 11) so that either pair of notches may be engaged with the pins 83 and the platform thus moved toward or away from the spindle, thus providing a means for supporting either 10- or 12-inch records.

The ejector for the records consists of a plate 92 of generally rectangular formation slidably supported on top of the record platform being held thereon by lugs 93 struck from the platform on each side and extending upwardly upon the base and slightly overhanging the top of the plate. The plate is urged rearwardly by a spring 95 one end of which is secured to a lug 96 in the ejector and the other end of which is secured to a lug 97 struck upwardly from the platform and extending through a slot 98 in alignment with the lug 96. The slot 98 extends from the forward edge of the opening 100 longitudinally of the plate toward the front, as can best be seen in Fig. 12. The rear end of the plate 92 is provided with an opening 100. This forms a pair of arms on each side of the opening, 101 being a substantially straight arm and which is engaged by a lug 102 at the rear struck up from the platform and which lug serves as a stop limiting the movement of the ejector to the rear which movement is caused by the spring 95. The arm 103 on the other side is wider at the rear at 104 and gradually narrows inwardly towards the center of the ejector to provide a means for contact with the ejector lever 72 as will hereinafter more clearly appear. The bottom 105 of the opening is therefore wider at this point and also provides a contact surface for the ejector member 72. The ejector lever, which travels in an arcuate path when the tone arm is swung by the rotary movement of the sleeve 55, engages the edge 105 of the opening 100 when 12-inch records are played, and with part 104 when 10-inch records are being played to control the ejection and return of the tone arm. Since the plate 92 is slidable on the support 86 against the tension of the spring 95 the lever 72 causes the slide to be moved in one direction and when the lever is withdrawn from contact with the wall 105 or the leg 104 the spring 95 returns the plate to its normal position. The manner in which the lever contacts the leg 104 is best shown in Fig. 1.

On the slide member 34 at the slot 53 there is provided a spring 51 secured to the slide by lugs 54 which spring is of a formation for engaging the pin 60 on the lever 57 to exert a slight pressure on the pin tending to rotate the lever and the tone arm support urging the tone arm in an outward direction.

In operation a stack of records is placed on the spindle with the bottom record resting on the shoulder 78 adjacent its center hole and with the edge resting on seat 86*a* of the platform 86, as best shown in Fig. 2. All the records could be placed on the spindle if desired and the mechanism tripped to cause the first record to be ejected. For purposes of simplicity and explanation, however, I am considering that one record has already been placed on the turntable 12.

The turntable is rotated by the rim drive motor 19 through the drive wheel 20 in a manner well known in the art. The tone or pickup arm with the needle engaged in the recording groove picks up the vibrations as the turntable rotates and converts them into electric impulses which are amplified in the usual manner and reproduced in a loud speaker, not shown.

As the pickup arm moves across the record towards the center of the record and the terminus of the record groove, it moves with it its support including the sleeve 55 which extends below the turntable and carries on its end the lever 57. This causes the rod or lever 45 which has the trip end 45*a* extending down through the slot 47 in the slide 34 to be pulled to the right as viewed in Fig. 2 and when the record reaches the end of the groove the eccentric or spiral portion of the record groove having the greater pitch causes a relatively large movement of the tone arm which causes the trip 45*a* to be withdrawn from contact with the lug 46 allowing the spring 48 to push against the lug 50 and rotate the wheel 37 so that the eccentric wheel with its friction ring 42 comes into engagement with the hub 27. The eccentric wheel is then driven by the hub. Since the wheel is eccentrically mounted the rotation of the wheel causes the slide 34 to move to the right as viewed in Fig. 2 against the tension of the spring 44. The first movement of the slide causes the cam 52 to engage with the rod 75 which extends upward through the sleeve 55 to raise the tone arm upward off the record, the bent portion 76 engaging in the seat 77 on the under side of the tone arm housing.

Figure 6:
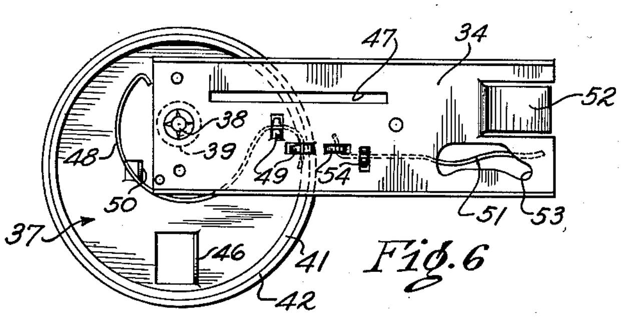
Fig. 6 is a plan view of the eccentric wheel and cam slide assembly showing the wheel rotated 90° from that of Fig. 3.
Figure 7:
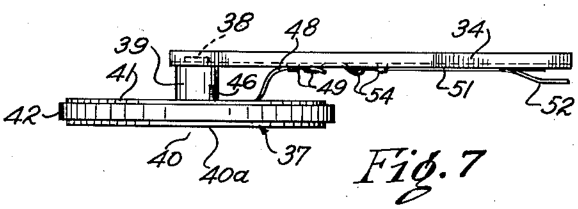
Fig. 7 is a side elevational view thereof.

As the slide progressively moves away from the spindle the pin 60 on the other end of the lever 57 attached to the sleeve 55 engages with the spring 51 and eventually hits in the end of the opening 53 closest to the eccentric wheel as viewed in Fig. 6. This causes the lever 57 to be rotated which in turn rotates the sleeve 55 and this rotates the pickup arm through the support 61. The pickup arm then moves to the position slightly beyond that shown in Fig. 1 where it is clear of the largest record (12-inch) that may be played by the apparatus. At the same time the support 61 carries with it the ejector member 72 which extends upward through the opening 82 in the ejector and record support.

The movement of the slide continues until eventually the member 72 strikes the ejector slide at the edge of the rearwardly extending arm 104. This movement continues, the cam slide having nearly reached the end of its travel, and the member 72 pushes the slide 92 sliding it between the lugs 93 against the pressure of the spring 95. The edge of the slide eventually engages the edge of the bottommost record of the stack as can best be seen from Fig. 2 sliding the record under the stack off of the shoulder 78 and off of the platform 86 after which it drops downward around the spindle onto the record already on the turntable. The remaining records fall on top of the slide and onto the shoulder of the stationary spindle.

At this point the eccentric wheel has reached the limit of its eccentric movement and the cam slide ceases to slide on the supporting frame. All during this time the spring 44 has held the slide and wheel in firm engagement with the hub 24. As the greatest radius of the wheel revolves away from the hub the slide is pulled back to the spindle by the spring 44. During the first part of the movement of the slide the tone arm is returned to a predetermined position by the spring 95 which pulls the ejector 92, the arm 104 pressing against the ejector member 72 to rotate the tone arm support 61 and sleeve 55 together with the tone arm until the ejector slide is stopped by the lug 102.

At this time the spring 51 which is bearing against the lug 60 carried by the lever 57 keeps the tone arm in its outward position but does not press against the lug 60 sufficiently hard to overcome the tension of the spring 95 so that the tone arm automatically comes to a position which is the proper playing position for the start of the playing of a 10-inch record, this position being shown in Fig. 1. The inward travel of the tone arm then ceases. The cam slide then continues in its travel towards the spindle the tone arm raising rod 75 sliding down the inclined cam 52 until it reaches the point shown in Fig. 2 where the tone arm or pickup is lowered onto the record in the outside of the record groove.

At this point it will also be noted that when the tone arm is swinging outward after the eccentric wheel was tripped the lever 57 was rotated in a counterclockwise direction together with a member 45 and the trip lug 45*a*. The trip lug is thus brought back into the path of travel of the lug 46 on the eccentric wheel and as the wheel rotates the spring 48 again gains control over the lug 50 and pushes the eccentric wheel in a counterclockwise direction with the lug 46 engaging the trip lug 45*a*. The eccentric wheel is stopped and the friction surface on the eccentric wheel is out of engagement with the hub 27. The record thus starts playing and is played until the movement of the tone arm against it withdraws the trip lug from control with the lug 50 after which the spring 48 again gives the eccentric wheel a push and the cycle is again repeated.

Figure 12:
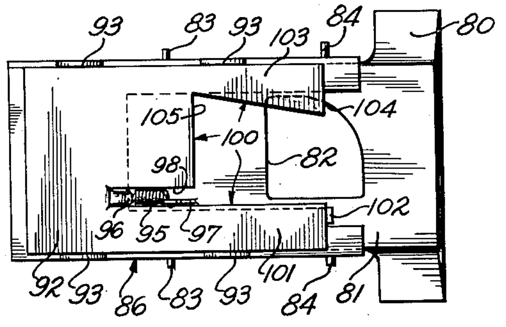
Fig. 12 is a top plan view of the arm of Fig.

The drawings have shown the record supporting mechanism in the position for 10-inch records. When it is desired to play a stack of 12-inch records the record support 86 is lifted upward so that the notch 88 is disengaged from the pins 83 and the support slid backward on the base 81, the pins 84 sliding in the groove 87. The support is then lowered with the notches 89 in engagement with the pins 83. At this time the ejector member 72 extends up through the ejector slide in the opening 100 (Fig. 12). The operation in this instance is the same as that previously described except that in the 12-inch position the bottom 105 of the opening 100 is engaged by the trip member 72 instead of the end of the arm 104, the arm 72 moving the slide to eject the record as the tone arm swings outward and the slide 92 through the spring 95 pushing the tone arm back through contact of the surface 105 with the ejector arm 72.

It will be noted from the foregoing description that the ejector 92 actually returns the tone arm to the proper playing position and that overtravel of the tone arm was prevented by the spring member 51 which engaged the pin 60 on the lever 57. In this embodiment of the invention the spring 51 therefor always exerts some pressure on the pin 60 and the lever 57 having a tendency to rotate the tone arm toward the outer edge of the record. This pressure increases somewhat as the tone arm travels toward the center of the record.

I have therefore provided a modification of this portion of the invention wherein when the tone arm is set down upon the record it is completely free with no pressure being exerted thereon by the spring.

Briefly this device contemplates a lever attached to the pickup raising post which may be operated upon by a spring in a direction to move up the pickup arm outwardly when the pickup arm is raised and which lever is withdrawn from connection with the spring when the pickup arm is lowered.

More specifically as is shown in Figs. 15 et seq. the pickup raising pin 75 is made longer than in the preceding embodiment so that it extends farther below the sleeve 55. In this case the cam portion 52 in the slide will also be positioned lower to accommodate the same. The extension of the pin 75 has secured to it a lever 120 which is provided with a pin 121 that extends upward toward the frame 15. The lever is secured to the pin 75 by a set screw 122. The frame 15 is provided with an arcuate slot 123 (Fig. 16) which is concentric with the pin 75 and sleeve 55. The lever 120 is adapted to swing with the pin 75 and the tone arm, and the pin 121 extends through the slot 123 when the pin 75 is moved upward by the cam 52 and also may move arcuately in the slot when in the upper position. When the pin 75 is lowered, lowering the tone arm, the pin 121 is lowered below the frame to the position shown in Fig. 15.

The spring mechanism for operating on the lever 120 and pin 121 to swing the tone arm outwardly is disposed above the frame and comprises a lever 124 having a widened end portion 125 extending at an angle from the end of the lever. This lever is loosely secured to the frame 15 by a rivet 126. A spring washer 127 is interposed between the head of the rivet and the lever. The spring washer holds the lever flat against the frame but allows the end of the lever to be raised from the frame when it is struck by the pin 121 when the pin 75 is raised by the cam. The end 125 of the lever 124 extends over the slot 123 but does not cover the entire slot as can best be seen in Fig. 16.

The lever is urged in a counterclockwise direction by a spring 128 which has one end secured to the frame at 129, the other end of the spring being engaged in an opening 131 in the lever. Movement of the lever by the spring is limited by a stop 132 carried by the frame and which engages with the edge of the lever.

The tone arm causes the lever 120 to be rotated arcuately between two extreme positions which are substantially the extremities of the slot 123. As viewed in Fig. 16, when the tone arm is through playing a record and the stylus is nearest the spindle, the pin 121 is then below the slot 123 at the point nearest the bottom of the figure. When the trip releases the mechanism for moving the slide the first movement of the slide is to cause the cam 52 to raise the pin 75. The lever 120 raises with it and the pin 121 moves upward through the slot 123 and engages the underside of the portion 125 of the lever 124 raising the lever as best shown in Fig. 17. At this time the position of the lever 120 and 124 are as shown in Fig. 16.

Further movement of the cam slide moves the tone arm outward away from the center of the record as previously described. This causes the lever 120 to be rotated counterclockwise, the pin 121 traveling in the slot 123 and sliding under the lever 124 until the pin 121 slides beyond the end of the lever which is the extreme of the outward movement of the tone arm. The lever 124 then drops down to its normal position with the widened end opposite to the pin 121, as shown in Fig. 18.

When the ejector slide returns the tone arm toward its playing position the lever 120 is moved clockwise and the pin 121 engages with the end 125 of the lever 124 which offers resistance to the free movement of the tone arm. As in the previously discussed embodiment, the spring resisting the movement of the arm is not sufficiently strong to overcome the effort of the ejector slide spring but is sufficiently strong to prevent overtravel of the arm beyond the starting groove of the record.

Next when the tone arm is lowered the lever 120 is lowered with it and the pin 121 is withdrawn from contact with the end 125 of the lever 124 and all tension on the tone arm is released. The lever 124 springs back to its normal position where it is ready to be re-engaged by the pin 121 during the next cycle.

Since the tone arm raising pin 75 is now used to apply a turning as well as a raising force to the tone arm I contemplate providing a more positive engagement for the end 76. In this case as viewed in Fig. 20 the part 61 is provided with an upwardly extending portion 135 which has a slot 136 as shown in Fig. 21 in which the part 76 of the pin 75 may ride.

I also contemplate another form of ejector plate 92′ as viewed in Fig. 22 where instead of the arms 101 and 103 I have provided spaced openings 138 and 139. In this case the sleeve 55 extends through the tone arm and supporting head 61 and carries on its end a cam 140 which has an upwardly extending lug 141.

The cam 140 is disposed below the ejector slide with the lug 141 extending into one of the openings 138 or 139. The arm 76 extends through a slot 142 in the sleeve 55.

The device operates in the same manner as the previously described embodiment in that the lug 141 hits the edge of the opening 138 (Fig. 22) which is the opening used for playing 10-inch records, and moves the slide against the pressure of the spring. On the return the slide moves the tone arm by engagement with the lug 141. Rearward movement of the ejector plate is limited by the lugs 145 which engage with shoulders at the end of the reduced portion 146. This has the advantage of greater simplicity and better appearance.

It will be noted that the structure is extremely simple and utilizes considerably less space than is ordinarily necessary for automatic record players. The positioning of the records, support and ejector above the tone arm enables the record changing to be effected with a minimum of apparatus.

It will also be seen that no special metal panel need be supplied for supporting the mechanism since the mechanism really comprises only two units as best shown in Fig. 1, one unit comprising a frame which supports the record changing mechanism and the other unit comprising the motor drive, and that, therefore, the panel may be of wood with a simple opening therein and the mechanism secured underneath in the manner best shown in Figs. 1 and 2.

The elimination of the metal panel has a special advantage in present types of combination radios and phonographs since it does not materially shield the loop usually used in these types of combinations.

It will also be noted that all gears have been eliminated thus permitting the apparatus to function with a minimum of noise and one which requires a very small amount of lubrication and attention.

It has further been shown that the apparatus for adapting the player to 10- or 12-inch records is effected without moving any levers together with the usual complicated linkages found in such devices with the usual attendant wear and difficulties encountered in servicing. Furthermore, the changing from the 10- to 12-inch record is so simple that even those with no mechanical ability can effect the changing without disturbing the adjustments or turning something in the wrong direction and thus breaking the apparatus. The only adjustments necessary in a standard form may be effected through the set screw 110 which holds the pickup arm support 61 onto the sleeve 55 and the screw 111 which holds the lever 57 on the end of the sleeve 55.

Having thus described my invention I am aware that numerous and extensive departures may be made therefrom without departing from the spirit or scope of the appended claims.

I claim:

1. An automatic record player comprising a turntable for rotating the records to be played, drive means for driving the turntable, means supporting the unplayed records above the turntable including a stationary spindle for engagement with the records in the mid portion thereof and a second support at one side of the turntable, a pickup arm for playing the records on the turntable, means for supporting and operating the pickup arm comprising a pickup arm support spaced from the edge of the turntable, said second support comprising a record support and ejector for supporting the edges of the record and ejecting them singly from the stationary support and being disposed adjacent the base of the pickup arm and overhanging the pickup arm support and means on the pickup arm support extending through the pickup arm and engageable with the ejector to actuate the ejector.

2. An automatic record player including a main frame, a turntable spindle rotatably supported on one end of the frame and a turntable carried thereby, a pickup arm support disposed on the other end of the frame and a pickup arm carried thereby, a record support and ejector carried by the main frame, a cam member slidably supported by said frame and having means connecting it to the turntable spindle for reciprocating the same, said cam member having means connecting it to the pickup and pickup arm support to raise and lower and swing the pickup arm, means carried by said pickup arm support arranged for operative connection with the ejector to operate the ejector in timed relation to the pickup arm to eject a record, and means connected to the record support and ejector to return the ejector and rotate the pickup arm support and swing the pickup arm to playing position.

3. An automatic record player comprising a main frame, a turntable spindle rotatably journalled in the main frame, a turntable and a drive hub carried by said spindle, a cam slide carried by said main frame and having a driven wheel eccentrically carried thereby arranged for driven engagement with said hub, spring means connected to the slide and frame for pulling said slide toward said hub, said slide being out of engagement with the hub when the shortest radius is in line with and adjacent to the hub, spring means connected to the eccentric wheel for rotating the eccentric wheel into contact with the hub, trip means connected to the pickup arm and disposed for engagement with said eccentric wheel for preventing rotation thereof by said spring; a pickup arm support rotatably journalled on the frame and a pickup arm carried thereby, said support including a sleeve for swinging the support; a raising pin extending through the sleeve into contact with the pickup arm on one end and below the sleeve at the other end, a cam on said slide disposed for engagement with said pin; a lever adjustably carried by the sleeve, said slide being formed with a cam slot and said lever having a cam pin on one end extending into and engageable with a side of the cam slot, said trip means being connected to said lever, said pickup arm support being movable by the pickup arm to control the movement of said trip lug when a record is being played, a record support and ejector carried by said frame and having a portion extending over the pickup arm support and a record holding platform carried thereby and comprising a member hingedly connected at one end to said support and means for locking said support in alternate positions for supporting records of different diameters by its free end, ejector means for ejecting records singly from the bottom of the stack comprising an ejector slide disposed on said platform in alignment with the bottom record of the stack, an ejector operating lever carried by the pickup arm support and extending upward for operative engagement with said ejector slide, said cam slide adapted to move said pickup arm support to rotate the pickup arm beyond the side of the turntable and said ejector lever adapted to operate said ejector to eject a record when the pickup arm is beyond the side of the turntable and clear of the largest record to be played; spring means for said slide connected to the slide and its support to return the slide to normal record playing position where it is ready to engage the record on the bottom of the stack, said spring, through said slide, returning the pickup arm support and the pickup arm to a position for the pickup arm to be lowered into the outside of the record groove and stop means for engagement with the slide to limit the movement of the slide and determine the position of the return of the pickup arm, and a spring means for engagement with said cam pin to prevent overtravel of the pickup arm on its return to its playing position.

4. An automatic record player comprising a main frame of channel-shaped construction, a sub frame carried by the main frame at one end and a turntable spindle rotatably journalled in the main and sub frame, a turntable carried by said spindle above said main frame and a drive hub carried thereby below said frame, a cam slide member slidably journalled in the channel of said main frame and a driven wheel eccentrically carried by the slide arranged for driven engagement with said hub, spring means connected to the main frame and to the slide pulling said slide toward said hub and means for engagement with the slide to limit the movement of the slide toward the hub to hold the eccentric wheel out of engagement with the hub when the shortest radius of the wheel is in line with and adjacent the hub, spring means carried by the slide and connected to the eccentric wheel for rotating the wheel when out of engagement with the hub and trip means supported by the slide and in engagement with the wheel for preventing rotation thereof by said spring; a superstructure carried by said main frame above the frame and a pickup arm support rotatably journalled therein and a pickup arm carried thereby above said frame, and said support comprising a sleeve for swinging the support; a pin extending through the sleeve for raising the pickup arm, said slide having a cam disposed for engagement with said pin, said sleeve extending below the main frame and having a lever adjustably disposed on its end and being disposed between the main frame and the slide, said slide being formed with a cam slot and said lever having a pin on one end extending into and movable together with the lever by the sides of the cam slot, a member connected to the other end of said lever and having a trip lug holding arm extending through and guided by said slide, said pickup arm support adapted to control the movement of said trip lug and the pickup arm to control the movement of the support when a record is being played, a record and ejector support carried by said superstructure and having a portion extending over the pickup arm support and a record support carried thereby, and comprising a platform hingedly connected at one end to said support and means for engagement with said platform for locking said platform in alternate positions for supporting records of different diameters, the free end of said platform providing a support for a stack of records, means for ejecting records singly from the bottom of the stack comprising an ejector slide slidably disposed on said platform in alignment with the bottom record of the stack, said pickup formed with an opening therein and an ejector operating lever carried by the pickup arm support and extending upward through the platform adapted for operating engagement with said ejector slide, said cam slide adapted to move said pickup arm support to rotate the pickup arm beyond the side of the turntable and said ejector lever adapted to operate said ejector to eject a record when the pickup arm is beyona the side of the turntable and clear of the largest record to be played, and spring means for said ejector slide connected to the slide and its support to return the slide to normal record playing position where it is ready to engage the record on the bottom of the stack, said spring, through said slide, arranged to return the pickup arm support with the pickup arm to a position ready to be lowered into the outside record groove, and means for engagement with the ejector slide to limit the movement of the ejector slide and determine the position of the return of the pickup arm comprising an abutment to determine the return position of the ejector slide and a spring means carried by the cam slide engageable with said pin on the pickup arm lever and having less effect on the pickup arm than the spring means on the ejector slide to prevent overtravel of the pickup arm on its return to its playing position.

5. An automatic record player including a supporting frame, a turntable spindle rotatably journalled in said frame, a turntable carried by said spindle above said frame and a drive hub carried thereby below said frame, a cam slide member slidably carried by said frame and a driven wheel eccentrically carried by the slide adapted for driven engagement with said hub, spring means connected to the main frame and to the slide for resiliently holding said slide toward said hub and means for engagement with the slide to limit the movement of the slide toward the hub to hold the eccentric wheel out of engagement with the hub when the shortest radius is in line with and adjacent the hub, spring means carried by the slide and connected to the eccentric wheel for rotating the wheel when out of engagement with the hub, trip means for engagement with the wheel to prevent rotation by said spring while a record is being played; a pickup arm support rotatably journalled in said frame and a pickup arm carried thereby, said support including a sleeve for swinging the support, a pin extending through the sleeve for raising the pickup arm, said slide having a cam disposed for engagement with said pin, said sleeve extending below the main frame and having a lever adjustably disposed on its end, said slide being formed with a cam slot and said lever having a pin on one end extending into said cam slot and movable together with the lever by at least one of the sides of the cam slot, a member connected to the other end of said lever and having a trip means holding arm extending through and guided by said slide, said pickup arm support adapted to control the movement of said trip lug and the pickup arm to control the movement of the support when a record is being played, a record and ejector support carried by said frame and having a portion extending over the pickup arm and a record support carried thereby and comprising a platform hingedly connected at one end to said support and means for engagement with the support for locking said platform in alternate positions for supporting records of different diameters, the free end of said platform adapted to support the bottom record of a stack of records, means for ejecting records singly from the bottom of the stack comprising an ejector slide slidably disposed on said platform in alignment with the bottom record of the stack, said pickup arm formed with an opening therethrough and an ejector operating lever carried by the pickup arm support and extending upward through the pickup arm and platform arranged for operating engagement with said ejector slide, said cam slide adapted to move said pickup arm support to rotate the pickup arm beyond the side of the turntable and said ejector lever adapted to operate said ejector to eject a record when the pickup arm is beyond the side of the turntable and clear of the largest record to be played, and spring means for said ejector slide connected to said ejector slide and its support to return the slide to normal record playing position where it is ready to engage the record on the bottom of the stack, said spring through said slide arranged to return the pickup arm support with the pickup arm to a position ready to be lowered into engagement with the start of the record groove and means for engagement with the slide to limit the movement of the slide and determine the position of the return of the pickup arm comprising an abutment and spring means carried by the cam slide engageable with said pin in the pickup arm lever and having less effect on the pickup arm than the spring means on the ejector slide to prevent overtravel of the pickup arm on its return to its playing position.

6. An automatic record player comprising a main frame of channel-shaped construction, a sub frame carried by the main frame at one end and a turntable spindle rotatably journalled in the main and sub frame, a turntable carried by said spindle above said main frame and a drive hub carried thereby below said frame, a cam slide member slidably journalled in the channel of said main frame and means for reciprocating said cam slide in said main frame comprising a driven wheel eccentrically carried by the slide adapted for driven engagement with said hub, spring means connected to the main frame and to the cam slide pulling said slide toward said hub and means for engagement with the slide to limit the movement of the slide toward the hub to hold the eccentric wheel out of engagement with the hub when the shortest radius of the wheel is in line with and adjacent to the hub, means for moving said eccentric wheel into engagement with the hub comprising spring means carried by the slide and connected to the eccentric wheel, means for holding the eccentric wheel against rotation comprising a trip supported by the slide and in engagement with an abutment on the wheel, a super structure carried by said frame at the other end extending above the frame, a pickup arm support rotatably journalled therein and a pickup arm carried by the support above said frame said support including a sleeve for swinging the pickup arm, a pickup arm raising pin extending through the sleeve and resting on a cam on said slide, said sleeve extending below the main frame and having a lever on its end and disposed between the main frame and the slide, said slide being formed with a cam slot and said lever having a pin on one end extending into and movable by the sides of the cam slot, a member connected to the other end of said lever and attached to said trip lug, said trip lug extending through and guided by said slide, a record and ejector support carried by said superstructure and extending over the tone arm support and a record supporting platform carried thereby, and comprising a member hingedly connected at one end to said support and means carried by the support for locking said platform in alternate positions to support records of different diameters, the free end of said platform providing a support for a stack of records, means for ejecting records from the bottom of the stack comprising an ejector slidably disposed on said platform, the pickup arm being formed with an opening therein and an ejector operating lever carried by the pickup arm support and extending upward through the platform and pickup arm arranged for operating engagement with said ejector slide, said cam slide arranged to move said pickup arm support to rotate the pickup arm beyond the side of the turntable and said ejector lever arranged to operate said ejector to eject a record when the pickup arm is beyond the side of the turntable and clear of the largest record to be played, and spring means for said slide connected to the slide and its support to return the slide to normal record playing position where it is ready to engage the record on the bottom of the stack, said spring through said slide adapted to return the pickup arm support with the pickup arm to a position ready to be lowered into the outside record groove and means for engagement with the slide to limit the movement of the slide and determine the position of the return of the pickup arm comprising an abutment carried by the support to determine the return position of the slide.

7. An automatic record player including a rotatable turntable spindle and a turntable and drive hub carried thereby, a cam slide having a driven wheel eccentrically carried thereby disposed for driven engagement with said hub, means connected to the slide for pulling said slide toward said spindle, spring means connected to the eccentric wheel for rotating the eccentric wheel into contact with the hub, a pickup arm support for said player and a pickup arm carried thereby, said support including means for swinging the support, and means for raising the pickup arm, a cam on said slide disposed for operative engagement with said raising means, a cam slot formed in said slide and a lever carried by the support and having means for engagement in the cam slot, a record support and ejector having a portion extending over the tone arm support and a record holding platform supported thereon, and means for locking said platform in alternate positions on the support for supporting records of different diameters, ejector means for ejecting records singly from the bottom of the stack comprising an ejector disposed on said platform, an ejector operating lever carried by the pickup arm support and disposed in operative engagement with said ejector, said cam slide through said connection adapted to move said pickup arm support to rotate the pickup arm beyond the side of the turntable and said ejector lever through its connection with the pickup arm support to operate said ejector to eject a record when the pickup arm is beyond the side of the turntable and clear of the largest record to be played; means connected to said ejector to return the ejector to normal position where it is ready to engage the record on the bottom of the stack, said ejector arranged to move the pickup arm support and swing the pickup arm to a position for the pickup arm to be lowered into the outside of the record groove and stop means engageable with the ejector slide for limiting the return movement of the slide and predetermine the position of the return of the pickup arm.

8. An automatic record player including a turntable spindle and a turntable carried thereby, a cam slide having means carried thereby and disposed for driven engagement with said spindle, a pickup arm support for said player and a pickup arm carried thereby, said support including means for swinging the support; means for raising the pickup arm, a first cam means on said slide for engagement with and operation of said raising means, a second cam on the slide and a lever carried by the support and operated by said second cam, a record platform and record ejector support having a portion extending over the tone arm support and a record holding platform carried thereon, and means for adjusting said record holding platform on said support to alternate positions for holding different sized records, ejector means for ejecting records comprising an ejector carried by said platform, an ejector operating lever carried by the pickup arm support and disposed for engagement with said ejector slide, said cam slide connected to move said pickup arm support to rotate the pickup arm beyond the side of the turntable and said ejector lever adapted to operate said ejector to eject a record when the pickup arm is beyond the side of the turntable and clear of the largest record to be played; means connected to the ejector to return the ejector to normal position where it is ready to engage another record, said ejector being engaged with the pickup arm support to move it on the return movement of the record and swing the pickup arm back to playing position and means for engaging the slide to limit the movement thereof and determine the return position of the pickup arm.

9. A record changer mechanism comprising a driven record turntable and a support therefor, means for supporting the records in a stack above the turntable and for feeding them singly onto the turntable comprising a stationary center support for supporting the records at their centers and a support at one side of the turntable for supporting the records at their edges, said side support carrying ejector means for ejecting the records from the supports, means for operating said ejector comprising a rotatable member connected to the ejector means, a tone arm connected to said rotatable member and movable therewith, and means for raising said tone arm comprising a push rod extending coaxial with said rotatable member and having an angularly disposed extension extended from said rotatable member and into engagement with the tone arm.

10. An automatic record player comprising a frame, a rotatable turntable spindle and a record, ejector mechanism and tone arm support carried by said frame in spaced relation to the spindle, a turntable carried by said spindle, means for supporting records above said turntable and ejecting them singly onto the turntable including a spindle for supporting the records at their centers above the turntable, said ejector mechanism arranged to support the records at their edges and including a base, a platform carried thereby and movable to alternate positions for supporting records of different size, means for engaging the edge of the lowermost record of the stack for sliding the record off of the platform and the center support comprising a slidable member slidably supported and guided by said platform, said tone arm support journalled in said frame below said platform and a tone arm carried thereby, said slidable member being provided with spaced abutments, an opening in said platform support and a lever carried by said tone arm support extending into and swingable in said opening, said platform support when adjusted to alternate positions arranged to carry with it said slidable member and said slidable member disposed with one or the other of said abutments in the path of travel of said lever.

11. An automatic record changer including a frame having a turntable rotatably journalled in one end and having a driving member carried thereby, a record support and ejector disposed at the other end of said frame, a cam member slidably carried by said frame and having means for engagement with said driving member to reciprocate said cam member, a pickup arm support for supporting a pickup arm for swinging and vertical movement, said record support and ejector including a stationary member having a fixed portion extending over the pickup arm support, a record support carried by said fixed portion and movable to alternate locked positions for supporting records of different sizes, an ejector member slidably carried on said record support and having a portion arranged to be slid against the edge of a record on said support to move the record off the support, and means on said pickup arm support for operative engagement with said ejector means, said cam member being connected to said pickup arm support to rotate the same for swinging the tone arm to one side of a record on the turntable and to cause the said means on the pickup arm support to engage the ejector and eject a record.

12. An automatic record changer including a frame having a turntable rotatably journalled on one end and having a driving member carried thereby, a record support and ejector disposed at the other end of said frame, a cam member slidably carried by said frame and having means for engagement with said driving member to reciprocate said cam member, a pickup arm support for supporting a pickup arm for swinging and vertical movement, said record support and ejector including a stationary member having a fixed portion extending over the pickup arm support, a record support carried by said fixed portion and movable to alternate locked positions for supporting records of different sizes, an ejector member slidably carried on said record support and having a portion arranged to be slid against the edge of a record on said support to move the record off the support, and means on said pickup arm support for operative engagement with said ejector means, said cam member being connected to said pickup arm support to rotate the same for swinging the tone arm to one side of a record on the turntable and to cause the means on the pickup arm support to engage the ejector and eject a record, and means connected between the ejector member and its support to return it to normal position upon withdrawal of said cam means and through its connection with the pickup arm support to return said pickup arm to playing position.

13. An automatic record changer including a frame having a turntable spindle rotatably carried thereby, a cam member slidably mounted in said frame, means to reciprocate said cam member comprising a wheel eccentrically mounted on the cam member and engageable with the turntable spindle, means connected between the cam member and the frame normally holding said cam member toward said spindle, a support disposed at one end of the frame, and a pickup arm support and a record support carried thereby, said pickup arm support carrying a pickup arm, and said record support extending above said pickup arm support and including a platform hingedly carried by said first mentioned support and movable to alternate locked positions on the support for supporting records of different sizes, an ejector slidably mounted on said record support positioned for engagement with the edge of a record on said support and movable to dislodge a record from the record support, said cam member having a first cam surface and means in said pickup arm support for engagement with said first cam surface to raise the pickup arm, a second cam surface on said cam member and means on said pickup arm support for engagement therewith to be rotated thereby, means carried by said pickup arm support for engagement with said ejector upon rotation of the pickup arm to move said ejector to record disengaging positions and spring means connected between said ejector and record support to return said ejector to normal position and operable to move said pickup arm support and pickup arm to a position over the record to properly start the playing of the record.

14. An automatic record changer including a frame having a turntable spindle rotatably carried thereby, a cam member slidably mounted in said frame, means to reciprocate said cam member comprising a wheel eccentrically mounted on the cam member and engageable with the turntable spindle, means connected between the cam member and the frame normally holding said cam member toward said spindle, a support disposed at one end of the frame, and a pickup arm support and a record support carried thereby, said pickup arm support carrying a pickup arm, and said record support extending above said pickup arm support and including a platform hingedly carried by said first mentioned support and movable to alternate locked positions on the support for supporting records of different sizes, an ejector slidably mounted on said record support positioned for engagement with the edge of a record on said support and movable to dislodge a record from the record support, said cam member having a first cam surface and means in said pickup arm support for engagement with said first cam surface to raise the pickup arm, a second cam surface on said cam member and means on said pickup arm support for engagement therewith to be rotated thereby, means carried by said pickup arm support for engagement with said ejector upon rotation of the pickup arm to move said ejector to record disengaging positions, and spring means connected between said ejector and record support to return said ejector to normal position and operable to move said pickup arm support and pickup arm to a position over the record to properly start the playing of the record, said ejector being formed with separate surfaces for engagement with said ejector operating means in said positions of adjustment of the record support.

15. An automatic record changer including a frame having a turntable spindle rotatably carried thereby, a cam member slidably mounted in said frame, means to reciprocate said cam member comprising a wheel eccentrically mounted on the cam member and engageable with the turntable spindle, means connected between the cam member and the frame normally holding said cam member toward said spindle, a support disposed at one end of the frame, and a pickup arm support and a record support carried thereby, said pickup arm support carrying a pickup arm, and said record support extending above said pickup arm support and including a platform hingedly carried by said first mentioned support and movable to alternate locked positions on the support for supporting records of different sizes, an ejector slidably mounted on said record support positioned for engagement with the edge of a record on said support and movable to dislodge a record from the record support, said cam member having a first cam surface and means on said pickup arm support for engagement with said first cam surface to raise the pickup arm, a second cam surface on said cam member and means on said pickup arm support for engagement therewith to be rotated thereby, means carried by said pickup arm support for engagement with said ejector upon rotation of the pickup arm to move said ejector to record disengaging positions and spring means connected between said ejector and record support to return said ejector to normal position and operable to move said pickup arm support and pickup arm to a position over the record to properly start the playing of the record, said ejector being formed with separate surfaces for engagement with said ejector operating means in said positions of adjustment of the record support, and means on said record support to determine the normal position of the ejector member and hence the position of return of the pickup arm to position for starting the playing of a record.

WILLARD J. FAULKNER.

REFERENCES CITED

The following references are of record in the file of this patent:

UNITED STATES PATENTS

| Number | Name | Date |
|---|---|---|
| 1,357,602 | Welch | Nov. 2, 1920 |
| 1,469,152 | Boumphrey | Sept. 25, 1923 |
| 1,701,450 | Gordon-Cumming | Feb. 5, 1929 |
| 1,879,291 | Johnson et al. | Sept. 27, 1932 |
| 1,938,810 | Collison et al. | Dec. 12, 1933 |
| 2,062,396 | Carson | Dec. 1, 1936 |
| 2,286,490 | Knox | June 16, 1942 |
| 2,300,668 | Habegger | Nov. 3, 1942 |
| 2,328,641 | Glaser | Sept. 7, 1943 |
| 2,330,293 | Knox | Sept. 28, 1943 |
| 2,331,383 | Faulkner | Oct. 12, 1943 |
| 2,343,992 | Morrison | Mar. 14, 1944 |

FOREIGN PATENTS

| Number | Country | Date |
|---|---|---|
| 325,867 | Great Britain | Feb. 28, 1930 |
| 545,956 | Great Britain | June 19, 1942 |